United States Patent
Novotny et al.

(10) Patent No.: US 9,137,304 B2
(45) Date of Patent: Sep. 15, 2015

(54) METHOD AND APPARATUS FOR ACHIEVING DATA SECURITY IN A DISTRIBUTED CLOUD COMPUTING ENVIRONMENT

(75) Inventors: Hanan M. Novotny, Aberdeen, NJ (US); Kenneth E. DePaul, Wake Forest, NJ (US); Anish Sankalia, Lawrenceville, GA (US); Patrick Nta, Columbia, MD (US); Renaud Larsen, Uccle (BE)

(73) Assignee: Alcatel Lucent, Boulogne-Billancourt (FR)

(*) Notice: Subject to any disclaimer, the term of this patent is extended or adjusted under 35 U.S.C. 154(b) by 261 days.

(21) Appl. No.: 13/115,599

(22) Filed: May 25, 2011

(65) Prior Publication Data

US 2012/0303736 A1 Nov. 29, 2012

(51) Int. Cl.
| | |
|---|---|
| H04L 29/08 | (2006.01) |
| G06F 21/62 | (2013.01) |
| H04L 9/08 | (2006.01) |
| H04L 9/06 | (2006.01) |
| G06F 5/10 | (2006.01) |
| G06F 17/30 | (2006.01) |
| G06F 3/06 | (2006.01) |
| G06F 7/10 | (2006.01) |
| G06F 11/16 | (2006.01) |
| G06F 21/57 | (2013.01) |
| H04L 29/06 | (2006.01) |

(52) U.S. Cl.
CPC .......... *H04L 67/1008* (2013.01); *H04L 67/101* (2013.01); *H04L 67/1014* (2013.01); *H04L 67/1019* (2013.01); *H04L 67/1021* (2013.01); *H04L 67/1097* (2013.01); *H04L 67/2809* (2013.01)

(58) Field of Classification Search
CPC .... G06F 21/62; H04L 67/1097; H04L 9/0869
USPC ......... 709/201–203, 212–226, 230–232, 245, 709/246; 707/609, 636, 705, 715, 737, 753; 713/165; 726/26
See application file for complete search history.

(56) References Cited

U.S. PATENT DOCUMENTS

| | | | |
|---|---|---|---|
| 2009/0254572 A1 | 10/2009 | Redlich et al. | |
| 2010/0058476 A1 | 3/2010 | Isoda | |

(Continued)

FOREIGN PATENT DOCUMENTS

| | | |
|---|---|---|
| JP | 2005215735 A | 8/2005 |
| JP | 200820964 A | 1/2008 |
| WO | 2008056667 A1 | 5/2008 |

OTHER PUBLICATIONS

PCT/US2012/034803 Notification of Transmittal of the International Search Report and the Written Opinion of the International Searching Authority, or the Declaration dated Aug. 13, 2010.

*Primary Examiner* — Un C Cho
*Assistant Examiner* — Peian Lou
(74) *Attorney, Agent, or Firm* — Loza & Loza, LLP (57) ABSTRACT

A distributed cloud storage system includes a cloud storage broker logically residing between a client platform and a plurality of remote cloud storage platforms. The cloud storage broker mediates execution of a cloud storage process that involves dividing a data item into multiple portions and allocating the portions to multiple selected cloud storage platforms according to first and second rules defining a key known only to the cloud storage broker or to the client. At some later time when it is desired to retrieve the data item, the key is retrieved from storage and the rules are executed in a reverse fashion to retrieve and reassemble the data item.

20 Claims, 5 Drawing Sheets

(56) References Cited

U.S. PATENT DOCUMENTS

| | | |
|---|---|---|
| 2010/0091986 A1 | 4/2010 | Wakayama et al. |
| 2010/0153415 A1 | 6/2010 | Muntz |
| 2010/0332401 A1* | 12/2010 | Prahlad et al. ......... 705/80 |
| 2010/0332593 A1* | 12/2010 | Barash et al. ......... 709/203 |
| 2011/0252480 A1* | 10/2011 | Patawaran et al. ......... 726/26 |
| 2012/0042162 A1* | 2/2012 | Anglin et al. ......... 713/165 |
| 2012/0078643 A1* | 3/2012 | Nagpal et al. ......... 705/1.1 |

* cited by examiner

METHOD AND APPARATUS FOR ACHIEVING DATA SECURITY IN A DISTRIBUTED CLOUD COMPUTING ENVIRONMENT

FIELD OF THE INVENTION

This invention relates generally to computer security and, more particularly to data security in a distributed "cloud" computing environment.

BACKGROUND OF THE INVENTION

Cloud computing is a concept for providing computing resources and services from a packet-based virtualised "cloud" infrastructure, such that customers can access computing resources and/or services on demand from remote cloud service platforms rather than relying on on-premise hardware and storage resources. Customers may leverage the cloud, for example, to access off-premise data center storage resources as an alternative or supplement to on-premise storage resources. A cloud computing solution may utilize a private cloud (e.g., existing within the confines of a corporate Intranet), a public cloud (e.g., the Internet) or a hybrid cloud (e.g., combination of public and private cloud).

However, a problem associated with the cloud model and a barrier to its widespread adoption is the issue of data security. The virtualised nature of the cloud means that computing resources may be distributed across multiple devices and/or multiple cloud providers and the customer has limited clarity on where and how their data is being stored or who can access the data. Moreover, the cloud may be shared by many end users (including untrusted or unknown users) thereby opening windows of vulnerability to the data.

SUMMARY OF THE INVENTION

This problem is addressed and a technical advance is achieved in the art by a distributed cloud storage system incorporating a cloud storage broker logically residing between a client platform and a plurality of remote cloud storage platforms (e.g., without limitation, data center servers and associated storage resources). For a given data storage transaction, the cloud storage broker will select designated cloud storage platforms for cloud storage of a client data item and will mediate execution of a cloud storage process that involves dividing a data item into multiple portions according to a first rule and allocating the portions to the selected cloud storage platforms according to a second rule. The first and second rules thus define a "key" for achieving distributed cloud storage of the data item, the manner of which is known only to the key holder, and the distributed nature of the cloud storage makes the data less vulnerable to discovery from a compromised platform.

In one implementation (referred to herein as a "pass-through model"), the cloud storage broker directly participates in the data flow, i.e., it receives the data item from the client and divides and allocates the data item to the selected cloud storage platforms according to the first and second rules on behalf of the client. In another implementation (referred to herein as an "enterprise model"), the cloud storage broker does not directly participate in the data flow but rather instructs the client how to divide and allocate the data item, allowing the client itself to divide and allocate the data item to the selected cloud storage platforms. Thereafter, depending on the implementation, data retrieval may be accomplished by the cloud storage broker or the client having possession or access to the relevant rules.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
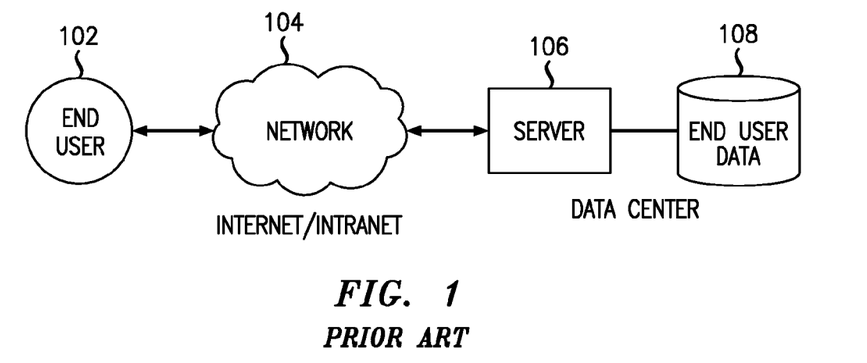
FIG. 1 is a block diagram of a cloud storage system according to the prior art.

FIG. 1 illustrates a cloud storage system 100 according to the prior art. The cloud storage system 100 includes one or more user platforms 102 interconnected by a network 104 to a data center (as shown, including a server 106 and associated storage resources 108). A typical data center includes multiple servers 106 mounted in racks which may occupy one or more floors of a building. The storage resources 108 may reside within respective servers 106 or may reside within separate components (not shown) in or alongside the racks of the data center. The term "cloud storage platform" will be understood herein to encompass both a server 106 and its associated storage resources 108. Thus, a typical data center consisting of multiple servers and storage resources will be understood to encompass multiple cloud storage platforms.

The user platforms 102 may comprise, for example, laptop computers, desktop computers or mobile computing devices, nominally including local data items (e.g., data files or the like) and which are subject to operation by users or administrators to possibly leverage the cloud storage platforms for off-premise storage of the data items on an as-needed basis. Depending on the network topology and/or the security needs of the user, the network 104 may comprise, for example, a corporate Intranet, the Internet, or some combination thereof; and the user data items may or may not be encrypted before they are transported to or stored in the cloud storage platforms.

Generally, however, regardless of network topology, cloud storage solutions according to the prior art are known to utilize a single-thread processing model yielding storage of user data items in a single location/platform. For example, as represented in FIG. 1, data from end user 102 is stored entirely within a single cloud storage platform (encompassing a single server 106 and its associated storage resources 108) and it is located within a single data center. Accordingly, the user data is vulnerable to discovery by untrusted or unknown users should the cloud storage platform (either the server 106 or storage resources 108) become compromised.

In contrast, embodiments of the present invention utilize a multi-thread processing model, whereby a client data item is divided into portions and the multiple portions are distributed among multiple cloud platforms, thus rendering the data item much less vulnerable to discovery since any given platform contains only a portion of the data item, and unknown or untrusted users are unlikely to discover how the data item was divided or allocated.

Figure 2:
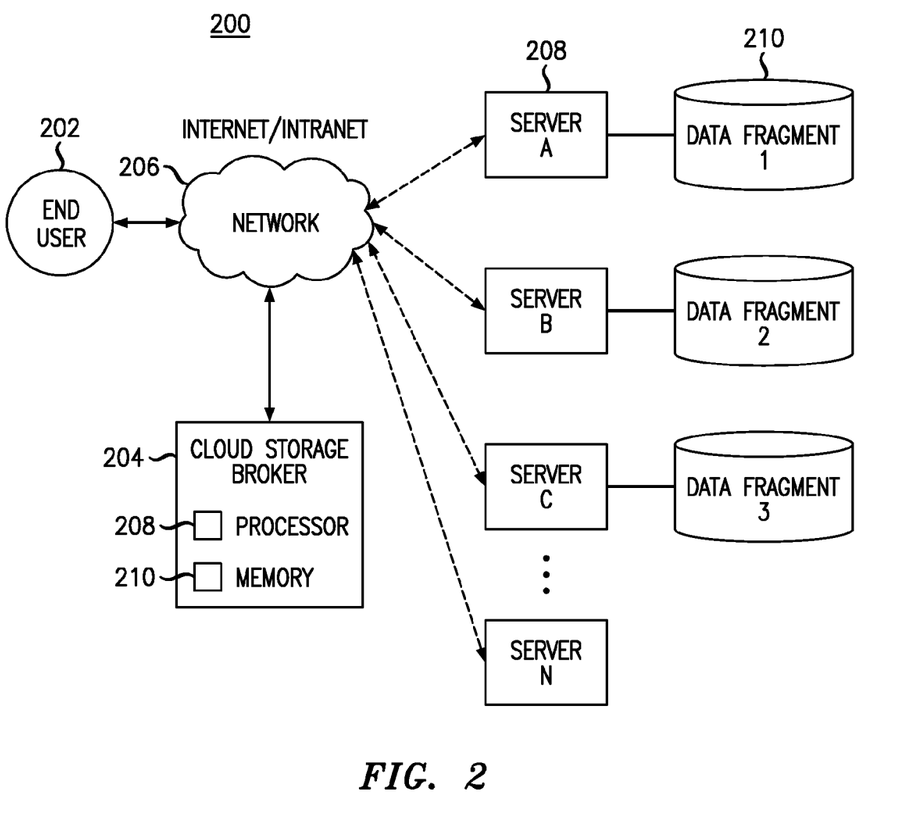
FIG. 2 is a block diagram of a distributed cloud storage system including a cloud storage broker according to embodiments of the present invention.

Referring to FIG. 2, a distributed cloud storage system 200 according to embodiments of the present invention includes one or more user platforms 202 logically connected via a network 206 to a cloud storage broker 204 and multiple cloud storage platforms 208, 210 (i.e., each cloud storage platform encompassing a server 208 and its associated storage resources 210). For convenience, the servers are denoted as "server B," "server B," etc. and they will be understood to correspond to different cloud storage platforms A, B, C, etc. The servers A, B, C, etc., (and hence the cloud storage platforms A, B, C, etc.) are distributed among multiple physical and/or geographic locations corresponding, for example and without limitation, to different physical locations with a rack, different racks or different floors of a data center, or among different data centers having different geographic locations.

The user platforms 202 may comprise, for example and without limitation, laptop computers, desktop computers or mobile computing devices, having a processor and memory (not shown) and nominally including local data items (e.g., data files or the like) that a user or administrator may wish to store in the cloud. The cloud storage broker 204 comprises, for example and without limitation, a web-based computing platform having a processor 208 and memory 210 and operable to mediate cloud storage and retrieval transactions between the user platforms 202 and selected cloud storage platforms 208, 210. The network 206 may comprise, for example, a corporate Intranet, the Internet, or some combination thereof. The cloud storage broker 204 may therefore reside internally or externally to a corporate firewall.

Generally, according to embodiments described herein, a cloud storage transaction is initiated by a user requesting a data storage service from the cloud storage broker 204. Depending on the privacy needs of the user, the user may send a data item to the cloud storage broker and request that the cloud storage broker execute cloud storage of the data item; or the user may request that the cloud storage broker mediate instructions for the user to execute cloud storage of the data item (i.e., allowing the user itself to execute cloud storage of the data item without involving the cloud storage broker in the data flow). Thereafter, the cloud storage broker selects designated cloud storage platforms to be used for the data storage transaction and either executes or mediates a cloud storage process to divide the data item into portions and distribute the portions among the selected cloud storage platforms in a secret manner known only to the keyholder cloud storage broker or user.

For example, as represented in FIG. 2, data from end user 202 is divided into three portions (denoted data fragment 1, 2 and 3) and the respective portions are distributed among three different cloud storage platforms A, B, C according to rules known only to the cloud storage broker or user defining a "key." Since the client data is divided and distributed according to a secret key among multiple cloud storage platforms A, B, C, and since each of the cloud storage platforms correspond to a different physical and/or geographic locations, the client data is relatively invulnerable to discovery even in the event that the cloud storage platforms A, B or C become compromised.

Figure 3:
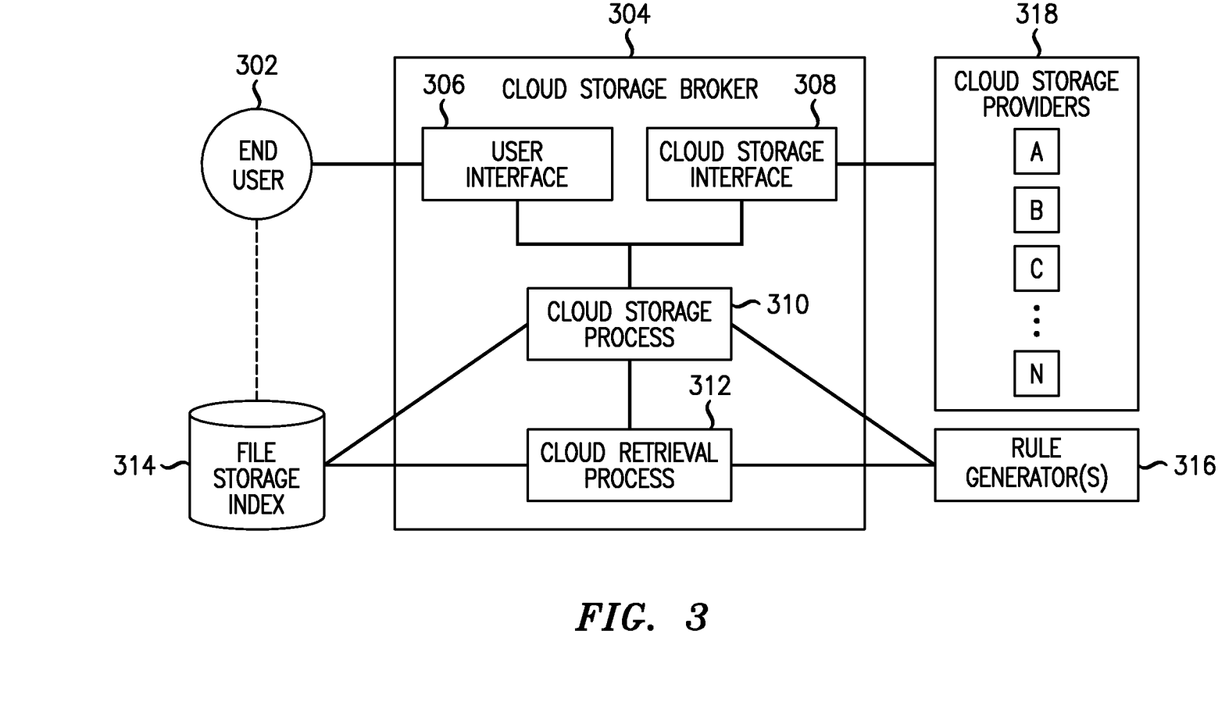
FIG. 3 is a block diagram illustrating functional components of the cloud storage broker according to embodiments of the present invention.

FIG. 3 shows an embodiment of a logical hardware configuration of the cloud storage broker 304. The logical hardware configuration includes a user interface 306 operable to communicate with the end user platform 302 coincident to cloud storage or retrieval transactions; for example and without limitation, to receive and process user requests, receive user data items, exchange authentication information, communicate instructions or rules associated with cloud storage or retrieval transactions. The logical hardware configuration further includes a cloud storage interface 308 operable to communicate with one or more cloud storage providers 318 coincident to cloud storage or retrieval transactions; for example and without limitation, to poll and/or monitor cloud storage providers for information relevant to selecting cloud storage platforms A, B, C for cloud storage of a data item, to send allocated portions of data items to respective platforms or to retrieve the allocated portions of data items from the respective platforms.

The user interface 306 and cloud storage interface 308 are operably connected to a cloud storage process module 310 and cloud retrieval process module 312. The cloud storage and retrieval process modules 310, 312 may be implemented, for example and without limitation, by the processor 208 (FIG. 2) operable to execute program code (e.g., including but not limited to operating system firmware/software and application software) stored in the memory 210 (FIG. 2) to execute or mediate cloud storage and retrieval transactions.

As will be appreciated, the user interface 306, the cloud storage interface 308 and the cloud storage process and cloud retrieval process modules 310, 312 are logical hardware components that may be implemented in one or more physical devices and may implement one or more communication technologies including wired, wireless or packet-based links. Each one of the logical components can comprise firmware, microchips (e.g., ASICs), software executable on a hardware device, hardware, specialized hardware, and/or the like.

As shown, the cloud storage and retrieval process modules 310, 312 are operably connected to a file storage index 314 and one or more rule generators (a.k.a., key generators) 316. The file storage index 314 and rule generators 316 are functional elements that may be implemented in one or more physical devices and/or software modules and may reside internally or externally to the cloud storage broker 304.

In one embodiment, the file storage index 314 stores information associated with various user data items (e.g., "files") and the manner in which they were divided and/or stored in the cloud, provided by the cloud storage process module coincident to completing a cloud storage transaction; and which information may be later accessed by the cloud retrieval process module to perform a cloud retrieval transaction. For example and without limitation, the file storage index may include file names or other indicia of user data items indexed to keys, rules or instructions that were used by the cloud storage process module to divide and distribute respective data items among modules A, B, C. At some later time, the cloud retrieval process module may consult the file storage index to find the keys, rules or instructions that were used to divide and distribute particular data items so that it may retrieve and reconstruct the data items.

The rule generators 316 generate or derive keys, rules or instructions for dividing and allocating a data item coincident to a cloud storage transaction. In one embodiment, the rule generators 316 prescribe separate ("first and second") rules for dividing and allocating a data item to multiple cloud storage platforms. The first and second rules thus define a key for achieving distributed cloud storage of the data item, the manner of which is known only to the key holder. As will be appreciated, the keys, rules or instructions may vary in complexity depending on the security needs of the user, file size, number of selected cloud storage platforms and the like.

For example and without limitation, at the lower end of complexity, the rule generator may prescribe a first rule to divide a file into equal parts corresponding to the number of selected cloud storage platforms; and a second rule to allocate the respective parts to the selected platforms in a particular sequence. As another example, the first rule may prescribe shredding a file into fragments of a predetermined size (e.g., based on a predetermined portion of the file size); and the second rule to allocate the fragments sequentially to the selected platforms until the file is completely shredded.

At a higher level of complexity, the rule generator may create or derive rules based on random or pseudo-random numbers to determine how to divide and/or distribute the data items. The random numbers are created by a random number generator that may reside within the rule generator or the cloud storage broker. For example and without limitation, consider a random number generator that creates random numbers bound to a predetermined range (e.g., between 2 and 20). For determining shred sizes, the random numbers may be mapped to a predetermined shred sizes (e.g., number 2=64 bytes, number 3=128 bytes, etc.). In this example, the rule generator may therefore generate a random number between 2 and 20 and prescribe a first rule to shred the file into fragments having a size depending on the generated random number. The rule generator might then prescribe a second rule based on the same random number or a next random number to determine how many cloud storage platforms to use (e.g., number 2=2 platforms, number 3=3 platforms, etc.) At a still higher level of complexity, a sequence of random numbers may be used where consecutive random numbers in the sequence dictate different shred sizes and different platforms (e.g., number 2=platform #2, number 3=platform #3, etc.)

Figure 4:
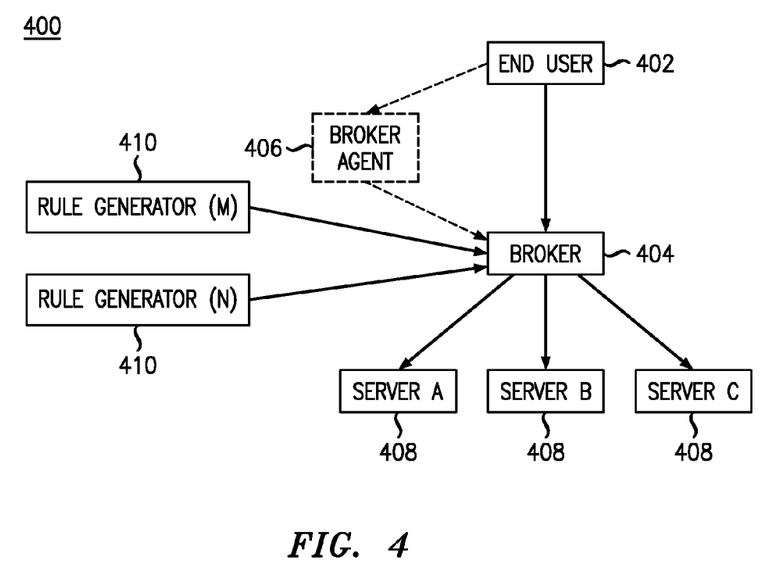
FIG. 4 is a block diagram illustrating a pass-through model of a distributed cloud storage system according to embodiments of the present invention.

As previously noted, the present invention may be implemented in different ways depending on the security needs of the user, the network topology and the like. In one implementation (FIG. 4), referred to herein as a "pass-through model," the cloud storage broker directly participates in the data flow, i.e., it receives the data item from the client and divides and allocates the data item to the selected cloud storage platforms according to the first and second rules on behalf of the client. Accordingly, as represented in FIG. 4, the cloud storage broker 404 logically resides between the end user 402 and various selected cloud storage platforms 408 (servers A, B, C) and the cloud storage broker 402 interacts with the end user 402 and selected servers A, B, C to execute cloud storage of a given data item, whereas the user 402 does not directly interact with the servers A, B, C. As shown, the cloud storage broker 404 is operably connected to two rule generators 410 from which the cloud storage broker 404 may obtain first and second rules (M, N) for dividing and allocating a data item; and the cloud storage broker 404 executes the rules M, N to store the data item.

Optionally, as represented in FIG. 4, the end user 402 may interact with the cloud storage broker 404 by way of a broker agent 406 (e.g., a serving node in a visited network). In one embodiment, a cloud storage transaction is initiated by the end user 402 sending a request (and coincident to the request, a data item) to the broker agent 406, and the broker agent forwards the request and the data item to the cloud storage broker 404. Thereafter, the cloud storage broker 404 executes rules (M, N) to divide and allocate the data item to selected cloud storage platforms substantially as described above. Cloud retrieval transactions are similarly initiated by the end user interacting with the cloud storage broker 404 by way of a broker agent 406.

Alternatively, the broker agent 406 may emulate the functionality of the broker 404. In one embodiment, for example, a cloud storage transaction is initiated by the end user 402 sending a request (and coincident to the request, a data item) to the broker agent 406, the broker agent queries the broker 404 to obtain the rules (M, N) or alternatively, the broker agent may independently identify rules (M, N) for dividing and allocating the data item, and the broker agent 406 executes the rules (M, N) to divide and allocate the data item to selected cloud storage platforms. Similarly, the broker agent 406 may emulate the functionality of the broker 404 to execute cloud retrieval transactions.

Figure 5:
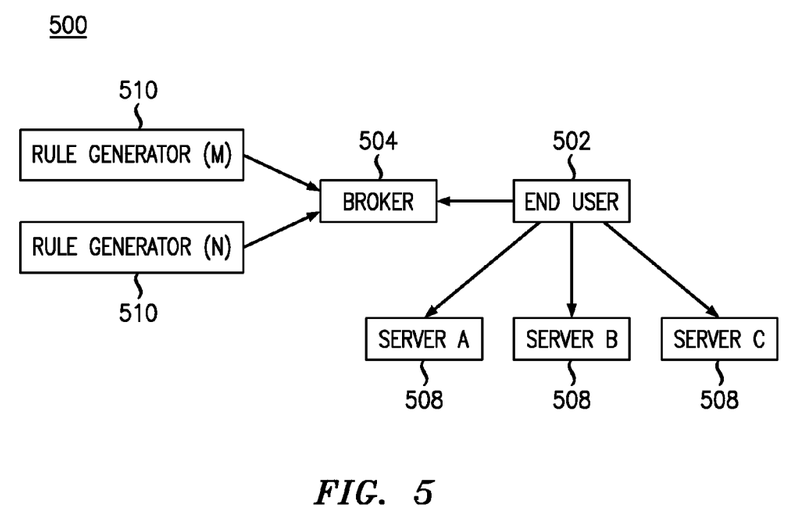
FIG. 5 is a block diagram illustrating an enterprise model of a distributed cloud storage system according to embodiments of the present invention.

In another implementation (FIG. 5), referred to herein as an "enterprise model," the cloud storage broker does not directly participate in the data flow but rather instructs the client how to divide and allocate the data item, allowing the client itself to divide and allocate the data item to the selected cloud storage platforms. Accordingly, as represented in FIG. 5, the cloud storage broker 504 is logically connected to the end user 502 and interacts with the end user to mediate cloud storage of a given data item, but the cloud storage broker does not directly interact with the servers A, B, C (at least for purposes of executing cloud storage). The cloud storage broker 504 is operably connected to two rule generators 510 from which the cloud storage broker 404 may obtain first and second rules (M, N) for dividing and allocating a data item, and the cloud storage broker 504 communicates the rules M, N to end user 502 allowing the user to execute the rules M, N to store the data item.

Optionally, the end user 502 may interact with the cloud storage broker 504 by way of a broker agent (not shown in FIG. 5). For example, a broker agent may be used to accommodate roaming of the end user into a visited network. In such case, a cloud storage transaction in the enterprise model is initiated by the end user 402 sending a request to the broker agent, and the broker agent forwards the request to the cloud storage broker 504. Thereafter, the cloud storage broker 404 identifies rules (M, N) to divide and allocate the data item to selected cloud storage platforms, communicates the rules to the end user by way of the broker agent, and the end user executes the rules to achieve distributed cloud storage of the data item.

Alternatively, the broker agent may emulate the functionality of the broker 504. In one embodiment, for example, a cloud storage transaction in the enterprise model is initiated by the end user 402 sending a request to the broker agent, the broker agent queries the broker 504 to identify rules (M, N) (or alternatively, the broker agent may independently identify rules M, N) to divide and allocate the data item to selected cloud storage platforms, the broker agent communicates the rules to the end user and the end user executes the rules to achieve distributed cloud storage of the data item.

Figure 6:
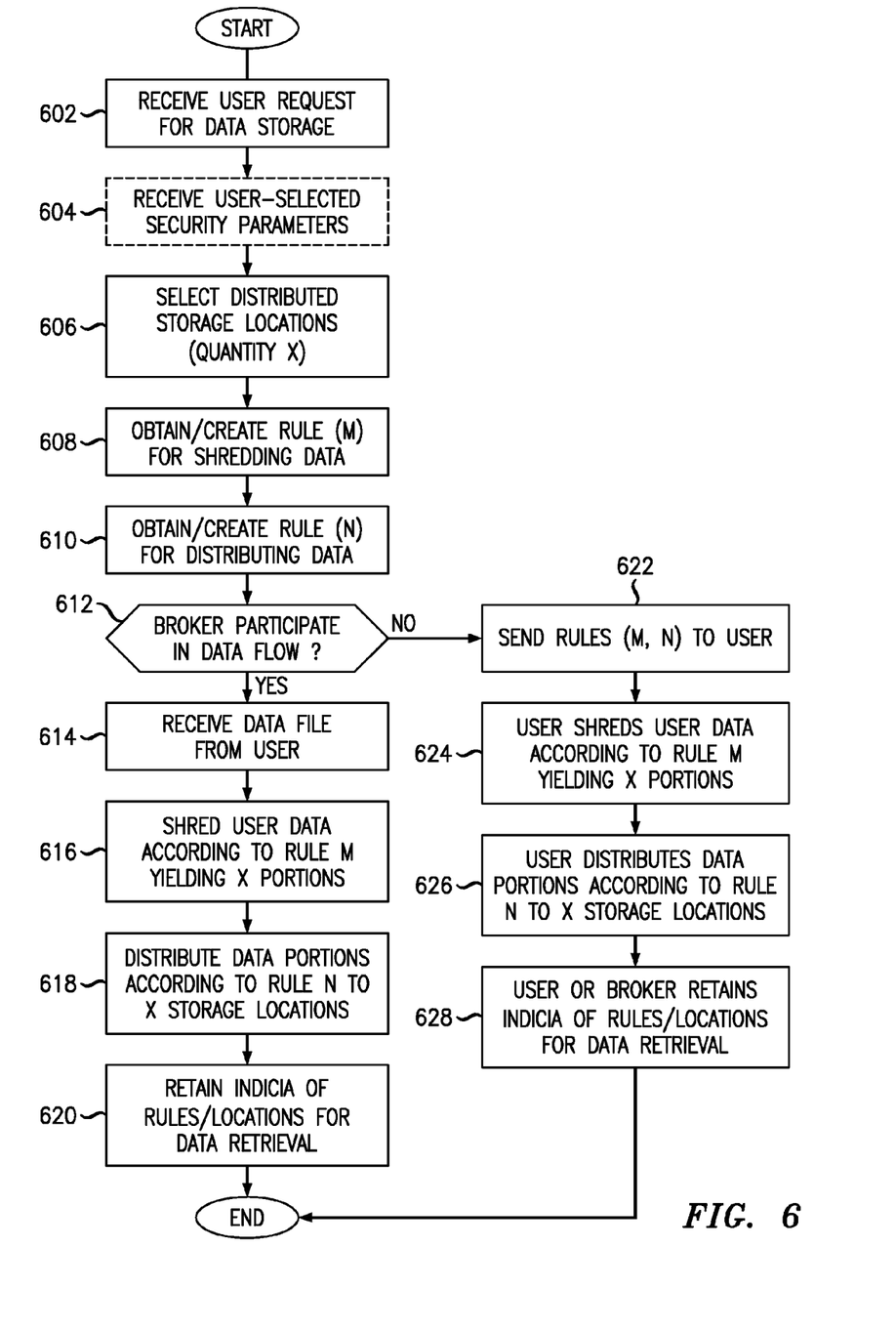
FIG. 6 is a flowchart showing steps performed by a cloud storage broker and/or user platform to execute a cloud storage process according to embodiments of the present invention.

FIG. 6 is a flowchart showing steps performed by a cloud storage broker and user platform where applicable to execute a distributed cloud storage transaction according to embodiments of the present invention. For example and without limitation, the steps of FIG. 6 may be performed by a cloud storage broker 404 in conjunction with an end user platform 402 in the pass-through model described in relation to FIG. 4 or by a cloud storage broker 504 in conjunction with an end user platform 502 in the enterprise model described in relation to FIG. 5 to execute the distributed cloud storage transaction. The method presumes that the user platform 402, 502 communicates a user name and password, or other suitable security parameters to the cloud storage broker, and the cloud storage broker thereafter authenticates the user based on the supplied security parameters to initiate the transaction. As will be appreciated, a session may be established via any of several authentication schemes, having varying degrees of complexity and utilizing fewer, greater, or different types of security parameters.

At step 602, the cloud storage broker receives a user request for cloud storage of a data item (e.g., a data file). The user request may comprise generally any instance of communication from the user, including without limitation, keystrokes, keystroke or keypad combinations or representations that convey the user request for data storage and that convey information (e.g., file name, file size) coincident to the request.

In one embodiment, at step 604, the cloud storage broker receives one or more user-selected security or performance parameters coincident to the request. For example and without limitation, the user might specify requirements or preferences relating to latency, geographic locations, degree of disbursement (e.g., number of locations), cost, security level, encryption or the like associated with the data storage transaction.

At step 606, the cloud storage broker selects cloud storage platforms (e.g., servers A, B, C) to be used for storage of the data item consistent with the user-selected security or performance parameters. In one embodiment, server selection involves determining a quantity (X) of platforms to be used, based on a random number generator, followed by a selection of particular platforms according to a weighted algorithm that considers weighted workload, cost and latency factors from among a plurality of servers to optimize the server selection. For example and without limitation, the quantity (X) of platforms to be used may be determined corresponding to a random number between 2 and 20, and selection of individual platforms of the X platforms may be determined based on a weighted algorithm that considers weighted workload, cost and latency factors.

At steps 608, 610 the cloud storage broker obtains or creates rules (M, N) for shredding and distributing the data item. For example and without limitation, the rules M, N may be obtained in any of the ways described in relation to FIG. 3. As has been noted, the rules M, N may vary in complexity depending on the security needs of the user, file size, number of selected cloud storage platforms and the like.

At step 612, a determination is made as to whether the cloud storage broker is to participate in the data flow (for example, in a pass-through model (FIG. 4)) or whether the cloud storage broker will not participate in the data flow (for example, in an enterprise model (FIG. 5)). If the cloud storage broker is to participate in the data flow, the process proceeds to steps 614 to 620; otherwise, if the cloud storage broker will not participate in the data flow, the process proceeds to steps 622 to 628.

Pass-Through Model

At step 614, the cloud storage broker obtains the data item from the user.

At steps 616, 618, the cloud storage broker executes rules (M, N) for shredding the data item into portions and allocating the respective portions among the selected cloud storage platforms A, B, C. In one embodiment, the cloud storage broker opens a secure connection (e.g., using standard HTTPS protocol) with cloud storage platforms A, B, C before distributing the data portions to the platforms A, B, C.

At step 620, the cloud storage broker retains the rules (M, N) or indicia of the rules (M, N) so as to enable later retrieval and reconstruction the data items. For example and without limitation, the cloud storage broker may send to the file storage index, rules (M, N) indicating the number or identity of platforms, shred size and sequence; or indicia of the rules (M, N) such as the random number(s) that were used to derive the number or identity of platforms, shred size and sequence.

Enterprise Model

At step 622, the cloud storage broker sends the rules (M, N) or indicia of the rules (M, N) to the user. For example and without limitation, the cloud storage broker may send to the user platform, rules (M, N) indicating the number or identity of platforms, shred size and sequence; or indicia of the rules (M, N) such as the random number(s) that were used to derive the number or identity of platforms, shred size and sequence. In one embodiment, the cloud storage broker also opens a secure connection (e.g., using standard HTTPS protocol) between the user platform and the selected cloud storage platforms A, B, C before sending the rules (M, N) to the user.

At steps 624, 626, the user executes the rules (M, N) for shredding the data item into portions and allocating the respective portions among the selected cloud storage platforms.

At step 628, the user or cloud storage broker retains the rules or indicia of the rules (M, N) so as to enable later retrieval and reconstruction the data items. For example and without limitation, the user or cloud storage broker may send to the file storage index, indicia of the number or identity of platforms, shred size and sequence, or the random number(s) that were used to derive the number or identity of platforms, shred size and sequence.

Figure 7:
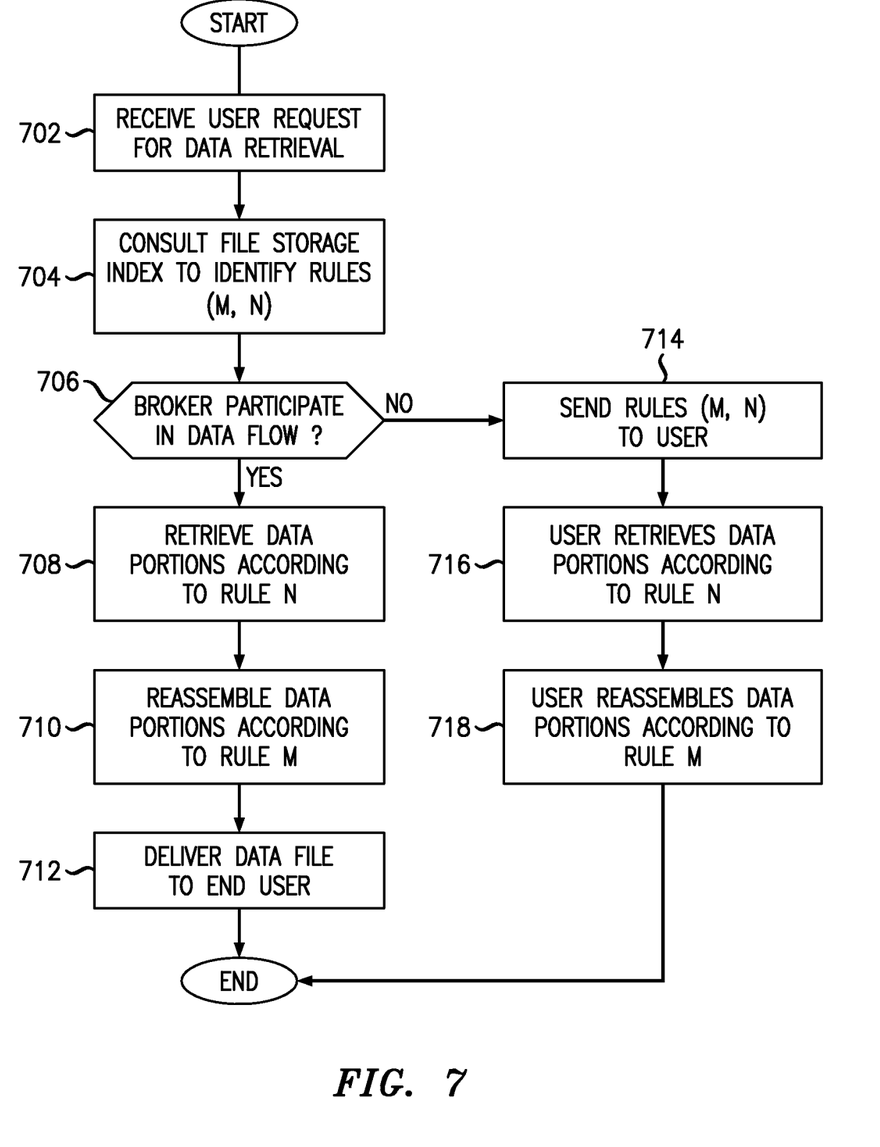
FIG. 7 is a flowchart showing steps performed by a cloud storage broker and/or user platform to execute a cloud retrieval process according to embodiments of the present invention.

FIG. 7 is a flowchart showing steps performed by a cloud storage broker and user platform where applicable to retrieve a data item from distributed cloud storage according to embodiments of the present invention. For example and without limitation, the steps of FIG. 7 may be performed by a cloud storage broker 404 in conjunction with an end user platform 402 in the pass-through model described in relation to FIG. 4 or by a cloud storage broker 504 in conjunction with an end user platform 502 in the enterprise model described in relation to FIG. 5 to execute the retrieval transaction. The method presumes that the user platform 402, 502 communicates a user name and password, or other suitable security parameters to the cloud storage broker, and the cloud storage broker thereafter authenticates the user based on the supplied security parameters to initiate the transaction. As will be appreciated, a session may be established via any of several authentication schemes, having varying degrees of complexity and utilizing fewer, greater, or different types of security parameters.

At step 702, the cloud storage broker receives a user request for retrieval of a data item (e.g., a data file). The user request may comprise generally any instance of communication from the user, including without limitation, keystrokes, keystroke or keypad combinations or representations that convey the user request for data retrieval and that convey information (e.g., file name) coincident to the request.

At step 704, the cloud storage broker consults the file storage index to obtain the rules (M, N) or indicia of the rules (M, N) that were used to divide and distribute the data item. For example and without limitation, the cloud storage broker may retrieve from the file storage index, indicia of the number or identity of platforms, shred size and sequence, or the random number(s) that were used to derive the number or identity of platforms, shred size and sequence.

At step 706, a determination is made as to whether the cloud storage broker is to participate in the data flow (for example, in a pass-through model (FIG. 4)) or whether the cloud storage broker will not participate in the data flow (for example, in an enterprise model (FIG. 5)). If the cloud storage broker is to participate in the data flow, the process proceeds to steps 708 to 712; otherwise, if the cloud storage broker will not participate in the data flow, the process proceeds to steps 714 to 718.

Pass-Through Model

At steps 708, 710, the cloud storage broker executes the inverse of rules (M, N) to retrieve the allocated portions of the user data item from among the selected cloud storage platforms and to reassemble the data item from the retrieved portions. The inverse of rules (M, N) will be understood to mean executing the rules (M, N) in a reverse fashion so as to accomplish retrieval and reassembly of the data item.

At step 712, the cloud storage broker delivers the reassembled data item to the user.

Enterprise Model

At step 714, the cloud storage broker sends the rules (M, N) or indicia of the rules (M, N) to the user. For example and without limitation, the cloud storage broker may send to the user platform, rules (M, N) indicating the number or identity of platforms, shred size and sequence; or indicia of the rules (M, N) such as the random number(s) that were used to derive the number or identity of platforms, shred size and sequence.

At steps 716, 718, the user executes the inverse of rules (M, N) to retrieve the allocated portions of the user data item from among the selected cloud storage platforms and to reassemble the data item from the retrieved portions. The inverse of rules (M, N) will be understood to mean executing the rules (M, N) in a reverse fashion so as to accomplish retrieval and reassembly of the data item.

FIGS. 1-7 and the foregoing description depict specific exemplary embodiments of the invention to teach those skilled in the art how to make and use the invention. The described embodiments are to be considered in all respects only as illustrative and not restrictive. The present invention may be embodied in other specific forms without departing from the scope of the invention which is indicated by the appended claims. All changes that come within the meaning and range of equivalency of the claims are to be embraced within their scope.

For example, the term "end user platform" as used herein is generally defined as any computer device including, without limitation, laptop computer, desktop computer, personal computer (PC), or mobile computing device, including, without limitation, personal digital assistant (PDA), tablet PC or mobile phone, nominally operated by a valid user and being operable to communicate with a cloud storage broker to execute cloud storage or retrieval transactions.

The term "cloud storage broker" as used herein is generally defined as a logical hardware component that is logically connected to the end user platform and that mediates or executes cloud storage or retrieval transactions. Most typically, the activity or transaction occurs following an authentication procedure in which the user supplies passwords or the like to gain access to the cloud storage broker and to establish a seemingly secure session. The cloud storage broker may comprise, without limitation, a web-based platform, or platform residing internal to the firewall of a business or government enterprise, may be distributed among multiple platforms or among multiple functional components in a single physical platform, and/or may be co-located in the same platform as the end user platform. Components of the cloud storage broker may include microchips (e.g., ASICs), software executable on a hardware device, hardware, specialized hardware, and/or the like.

The term "cloud storage platform" as used herein is generally defined as a logical hardware component that is logically connected to the cloud storage broker and that is operable to store user data items coincident to cloud storage transactions. The cloud storage platform may comprise, without limitation, a server and its associated storage resources residing within a data center; or it may comprise a virtualized platform distributed among multiple servers, storage resources and/or data centers (or distributed among multiple racks and/or floors of a data center). Conversely, multiple virtualized cloud storage platforms may be co-located within individual servers, storage resources and/or data centers (or individual racks and/or floors of a data center).

What is claimed is:

1. Apparatus for providing data storage services for a client, in accordance with a cloud computing model wherein a client platform is operably connected to a cloud storage broker and a plurality of remote cloud storage platforms, the apparatus comprising:

a user interface at the cloud storage broker;

a cloud storage interface at the cloud storage broker;

a memory at the cloud storage broker; and at least one processor operably coupled to the user interface, cloud storage interface and memory and configured to:

receive a first client request for cloud storage services associated with a data item;

in response to the first client request, determine a first rule of a plurality of first rules used to divide the data item of the client request into a plurality of data item portions and determine a second rule of a plurality of second rules used to allocate the plurality of the data item portions among the plurality of remote cloud storage platforms;

generate at least one random number;

communicate indicia of the first rule and the second rule and the at least one random number to the client to:

divide the data item into a plurality of data item portions in accordance with the determined first rule of the plurality of first rules, wherein dividing the data item varies independently from other data items and, the at least one random number is used to determine a size of the plurality of the data item portions based on the determined first rule; and allocate the respective portions among a number of the plurality of remote cloud storage platforms in accordance with the determined second rule of the plurality of second rules, wherein the number of the plurality of remote cloud storage platforms being based on the determined second rule, which defines that the plurality of the data item portions are stored in the at least one random number of the plurality of remote cloud storage platforms, wherein responsive to a second client request for data retrieval services, an inverse of the determined first rule and the determined second rule facilitates retrieval and reassembly of the data item.

2. The apparatus of claim 1, further comprising:

a rule generator module for creating at least one of the determined first and second rules to be used for respective data storage transactions; and a file storage index that maintains a database with information on various user data items including the determined first rule and the second rule and the at least one random number used for storing the various user data items.

3. The apparatus of claim 2, wherein the at least one processor is further configured to:
receive the second client request for the data retrieval services associated with the data item;
consult the file storage index to identify the indicia of the determined first rule and the determined second rule used to store the data item; and
communicate the indicia, in response to the second client request, of the determined first rule and the determined second rule.

4. Apparatus for providing data storage services for a client, in accordance with a cloud computing model wherein a client platform is operably connected to a cloud storage broker and a plurality of remote cloud storage platforms, the apparatus at the cloud storage broker comprising:
a user interface;
a cloud storage interface;
a memory; and
at least one processor operably coupled to the user interface, cloud storage interface and memory and configured to:
receive a client request for cloud storage services associated with a data item;
in response to the client request, determine a first rule of a plurality of first rules used to divide the data item into a plurality of data item portions and determine a second rule of a plurality of second rules used to allocate the plurality of the data item portions among the plurality of remote cloud storage platforms;
generate a plurality of random numbers;
divide the data item into the plurality of the data item portions of a random size in accordance with the determined first rule of the plurality of first rules, wherein the random size defined by the determined first rule based on at least one of the plurality of random numbers; and
allocate respective data portions of the plurality of the data item portions among a number of the plurality of remote cloud storage platforms in accordance with the determined second rule of the plurality of rules, wherein the number of the plurality of remote cloud storage platforms being based on the determined second rule, which uses at least a different one of the plurality of random numbers to define the number of the plurality of remote cloud storage platforms, wherein an inverse of the determined first rule and the determined second rule facilitate retrieval and reassembly of the data item to yield a reassembled data item.

5. The apparatus of claim 4, further comprising:
a rule generator module for creating at least one of the first and second rules to be used for respective data storage transactions; and
a file storage index for maintaining a record of an indicia of the first and second rules used for respective data storage transactions, wherein the indicia of the first and second rules includes the at least one of the plurality of random numbers and the at least a different one of the plurality of random numbers.

6. The apparatus of claim 5, wherein the at least one processor is further configured to:
receive a client request for data retrieval services associated with the data item;
consult the file storage index to identify the indicia of the determined first rule and the determined second rule that were used for the data storage services of the data item;
execute the inverse of the determined first rule and the determined second rule to retrieve and reassemble the data item, yielding the reassembled data item; and
deliver the reassembled data item in response to the client request.

7. Apparatus for providing data storage services of a client platform, in accordance with a cloud computing model, the client platform operably connected to a cloud storage broker and a plurality of remote cloud storage platforms, the apparatus comprising:
a memory; and
at least one processor operably coupled to the memory and configured to:
send a request for cloud storage services of a data item to the cloud storage broker;
responsive to the request, receive by the client platform from the cloud storage broker an indicia of: (a) selected cloud storage platforms of the plurality of remote cloud storage platforms for cloud storage of the data item, wherein each of the selected cloud storage platforms are to store an allocated portion of the data item; (b) a first rule that defines a manner of dividing the data item into a plurality of data item portions, wherein consecutive portions of the plurality of the data item portions have different randomly selected sizes and the plurality of the data item portions being respective in number to the selected cloud storage platforms; and (c) a second rule that defines a manner of allocating the respective ones of the plurality of the data item portions among the selected cloud storage platforms; and
divide, by the client platform, the data item into the plurality of the data item portions according to the first rule and allocate by the client platform the respective ones of the plurality of the data item portions among the selected cloud storage platforms according to the second rule, wherein an inverse of the first rule and the second rule facilitate retrieval and reassembly of the data item to yield a reassembled data item.

8. The apparatus of claim 7, wherein the at least one processor is further configured to:
send to the cloud storage broker, a request for data retrieval services associated with the data item;
responsive to the request, receive from the cloud storage broker an indicia of the first rule and the second rule; and
execute the inverse of the first rule and the second rule to retrieve and reassemble the data item from the plurality of the data item portions.

9. A method for providing data storage services in a client in a cloud computing model where a client platform being operably connected to a cloud storage broker and a plurality of remote cloud storage platforms, the method comprising:
receiving a client request for cloud storage services associated with a data item, wherein the client request includes security requirements for the data item;
choosing selected cloud storage platforms of the plurality of remote cloud storage platforms for cloud storage of the data item;
identifying a first rule among a plurality of first rules based on the security requirements, wherein the first rule defines a manner of dividing the data item into a plurality of data item portions, wherein the manner of dividing the data item varies independently from other data items and wherein the plurality of the data item portions have a random size determined by a random number generator;

identifying a second rule among a plurality of second rules based on the security requirements, wherein the second rule defines a manner of allocating respective portions of the plurality of the data item portions among a random number of the selected cloud storage platforms, the random number of the selected cloud storage platforms defined by the random number generator, wherein an inverse of the first rule and the second rule facilitate retrieval and reassembly of the data item to yield a reassembled data item; and communicating indicia of the first rule and the second rule to the client, thereby enabling the client to divide the data item into the plurality of the data item portions according to the first rule and to allocate the respective portions of the plurality of the data item portions among the selected cloud storage platforms according to the second rule.

10. The method of claim 9, further comprising:
receiving a client request for data retrieval services associated with the data item;
consulting, in response to the client request, a file storage index to identify the indicia of the first and second rules that were used to store the data item; and
communicating the indicia of the first and second rules to the client platform, thereby enabling the client platform to retrieve and reassemble the plurality of the data item portions according to the inverse of the first and second rule to form the data item.

11. An article of manufacture comprising a processor-readable non-transitory storage medium storing one or more software programs which when executed by a processor associated with a cloud storage broker perform the steps of the method of claim 9.

12. A method for providing data storage services for a client, in accordance with a cloud computing model wherein a client platform is operably connected to a cloud storage broker and a plurality of remote cloud storage platforms, the method comprising:
receiving a client request for cloud storage services associated with a data item;
choosing selected cloud storage platforms of the plurality of remote cloud storage platforms for cloud storage of the data item;
identifying a first rule that defines a manner of dividing the data item into a plurality of data item portions, wherein consecutive portions of the plurality of the data item portions of the data item have different randomly selected sizes;
identifying a second rule that defines storing the plurality of the data item portions in a random sequence among the selected cloud storage platforms;
obtaining the data item; and
dividing the data item into the plurality of the data item portions according to the first rule and allocating respective ones of the plurality of the data item portions among the selected cloud storage platforms according to the second rule, wherein an inverse of the first and second rules facilitating retrieval and reassembly of the data item to yield a reassembled data item.

13. The method of claim 12, further comprising:
receiving a client request for data retrieval services associated with the data item;
consulting a file storage index to identify indicia of the first and second rules that were used to store the data item;
executing the inverse of the first and second rules to retrieve and reassemble the plurality of the data item portions to yield a reassembled data item; and
delivering the reassembled data item to the client platform.

14. An article of manufacture comprising a processor-readable non-transitory storage medium storing one or more software programs which when executed by a processor associated with a cloud storage platform perform the steps of the method of claim 12.

15. In a cloud storage system including a client platform operably connected to a cloud storage broker and a plurality of remote cloud storage platforms, a method for providing distributed cloud storage of a data item comprising:
dividing the data item into a plurality of data item portions according to a first rule, wherein the first rule defines that consecutive portions of the plurality of the data item portions of the data item have different randomly selected sizes;
allocating the plurality of the data item portions to a plurality of selected cloud storage platforms according to a second rule, wherein the second rule defines a random number that determines a number the plurality of selected cloud storage platforms for storing the plurality of the data item portions; and
retaining indicia of the first and second rules for later data retrieval, wherein an inverse of the first and the second rule facilitating retrieval and reassembly of the data item to yield a reassembled data item.

16. The method of claim 15, wherein the step of dividing and allocating is performed by the client platform, responsive to receiving indicia of the first and second rules from the cloud storage broker.

17. The method of claim 15, wherein the step of dividing and allocating is performed by the cloud storage broker.

18. The method of claim 15, further comprising:
executing the inverse of the first and second rules to retrieve and reassemble the data item.

19. Apparatus of a cloud storage broker for providing data storage services, in accordance with a cloud computing model wherein a client platform is operably connected to a cloud storage broker and a plurality of remote cloud storage platforms, the apparatus comprising:
a user interface;
a cloud storage interface;
a memory; and
at least one processor operably coupled to the user interface, the cloud storage interface and the memory, the at least one processor configured to:
receive a client request for cloud storage services associated with a data item;
in response to the client request, determine a first rule of a plurality of first rules for dividing the data item into a plurality of data item portions, and determine a second rule of a plurality of second rules for allocating respective ones of the plurality of the data item portions among the plurality of remote cloud storage platforms, wherein an inverse of the first rule and the second rule facilitate retrieval and reassembly of the data item to yield a reassembled data item;
determine whether to participate in data flow for the data item;
when participating in the data flow for the data item:
divide the data item into the plurality of the data item portions in accordance with the first rule of the plurality of first rules, wherein dividing the plurality of the data item portions such that each varies independently from other data portions of the plurality of the data item portions and a size of the each of the plurality of the data item portions defined by the first rule is determined using at least one random number; and allocate the respective ones of the plurality of the data item portions among the plurality of remote cloud storage platforms in accordance with the second rule of the plurality of second rules, wherein the second rule defines that the plurality of the data item portions are stored in the at least one random number of the plurality of remote cloud storage platforms; and when not participating in the data flow for the data item:
communicate indicia of the first rule and the second rule and the at least one random number and second rules to the client platform, thereby enabling the client to divide the data item into the plurality of the data item portions in accordance with the first rule of the plurality of first rules and allocate the respective ones of the plurality of the data item portions among the plurality of remote cloud storage platforms in accordance with the second rule of the plurality of second rules.

20. The apparatus of claim 19, wherein the at least one processor is further configured to:
receive a client request for data retrieval services associated with the data item;
consult a file storage index to identify the indicia of the first rule and the second rule and the at least one random number used to store the data item;
determine whether to participate in data flow for the data item;
when participating in the data flow for the item:
execute the inverse of the first rule and the second rule to retrieve and reassemble the plurality of the data item portions to generate a reassembled data item; and
deliver the reassembled data item to the client platform; and
when not participating in the data flow for the data item:
communicate the indicia of the first rule and the second rule to the client, thereby enabling the client to retrieve and reassemble the plurality of the data item portions according to an inverse of the first rule and the second rule.

* * * * *